Nov. 3, 1942.  G. E. KEENE  2,300,624
MULTIPLE CURB CHAIN
Filed July 12, 1941  5 Sheets-Sheet 1

INVENTOR
George E. Keene
BY
Nathaniel Fuchs
ATTORNEY

Nov. 3, 1942.   G. E. KEENE   2,300,624
MULTIPLE CURB CHAIN
Filed July 12, 1941   5 Sheets-Sheet 2

INVENTOR
George E. Keene
BY Nathaniel Frucht
ATTORNEY

Nov. 3, 1942.   G. E. KEENE   2,300,624
MULTIPLE CURB CHAIN
Filed July 12, 1941   5 Sheets-Sheet 4
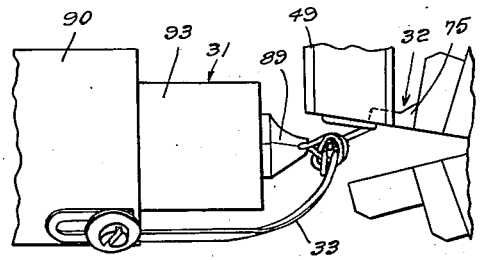
Fig. 20
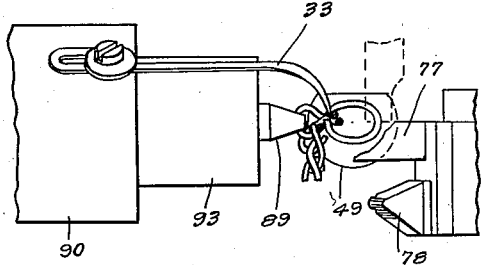
Fig. 21
Fig. 22
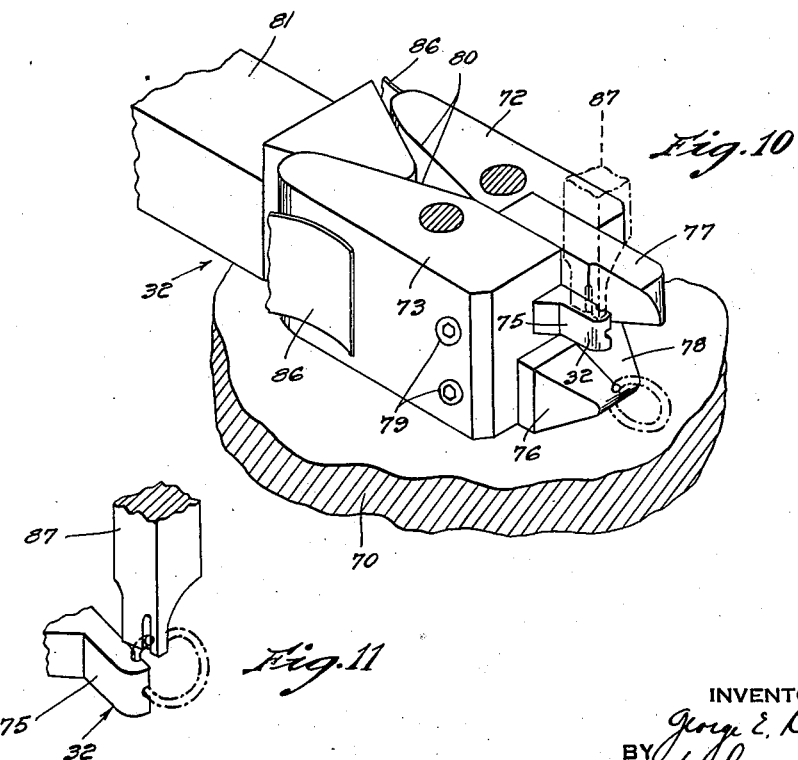
Fig. 10
Fig. 11
INVENTOR
George E. Keene
BY Nathaniel Frucht
ATTORNEY Nov. 3, 1942.   G. E. KEENE   2,300,624
MULTIPLE CURB CHAIN
Filed July 12, 1941   5 Sheets-Sheet 5
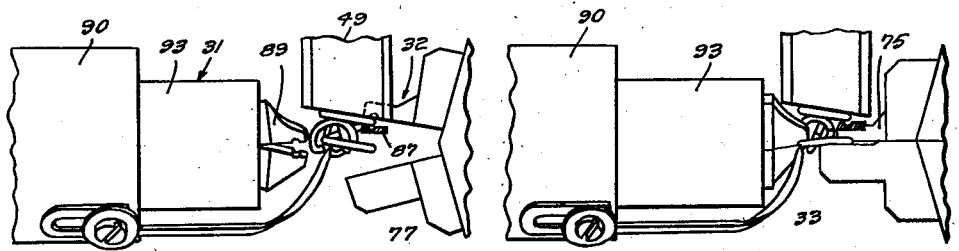
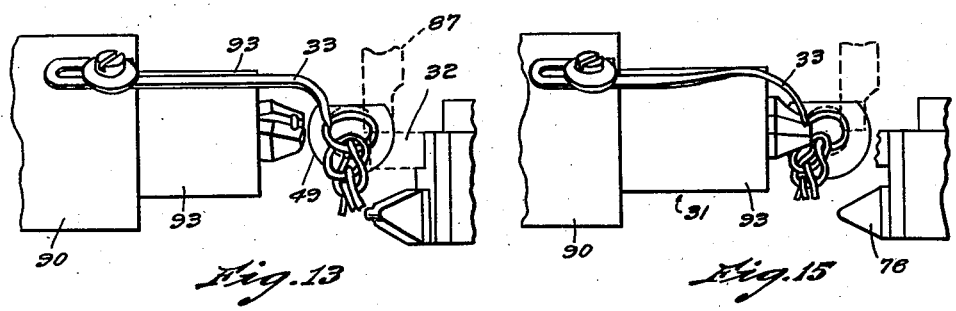
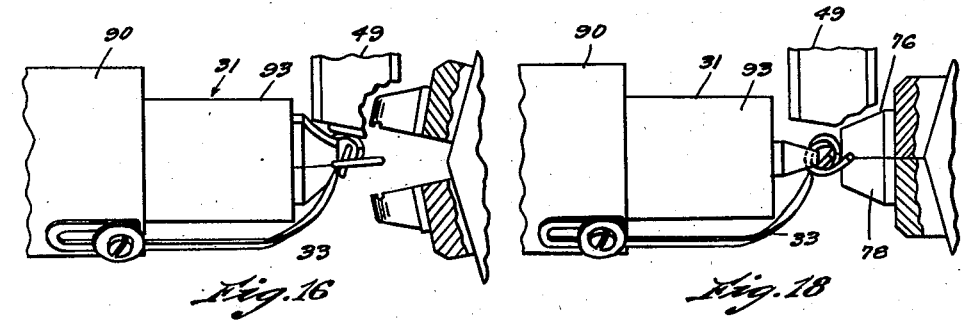
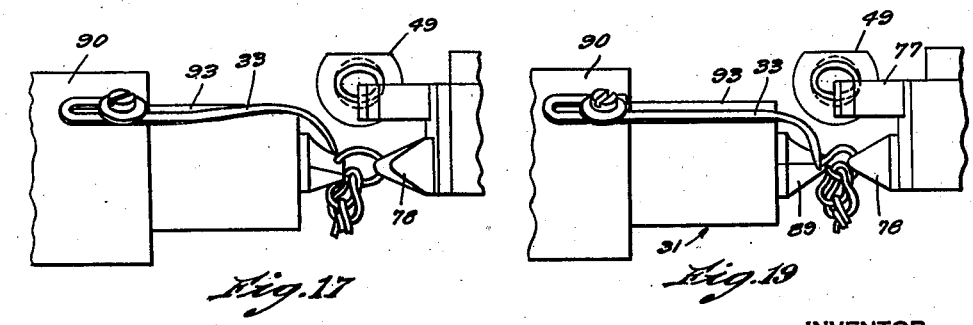
INVENTOR
George E. Keene
BY
Nathaniel Frucht
ATTORNEY Patented Nov. 3, 1942

2,300,624

UNITED STATES PATENT OFFICE 2,300,624

MULTIPLE CURB CHAIN

George E. Keene, Lakewood, R. I., assignor to Armbrust Chain Company, a corporation of Rhode Island Application July 12, 1941, Serial No. 402,207

11 Claims. (Cl. 59—17)

My present invention relates to chain machines, and more particularly to a machine for forming a multiple curb chain.

The principal object of the present invention is to provide a novel method and apparatus for forming a multiple curb chain in which each link passes through more than one link.

Another object of the present invention is to provide a multiple curb chain machine which is entirely automatic in its operation and which forms the curb chain from the wire stock to its completed form.

With the above and other objects and advantageous features in view, my invention consists of a novel apparatus and a novel method of manufacture more fully described in the detailed description following and more particularly defined in the claims appended thereto.

In the drawings:

Fig. 10 is an enlarged perspective view of the cutting and gripping jaws;

Fig. 11 is a detailed perspective view of the cutting jaw;

Figs. 12 and 13 are plan and side elevations respectively of the link forming portions of the machine in cutting position;

Figs. 14 and 15 are similar views showing the severed link gripped by the curbing jaw;

Figs. 16 and 17 are similar views showing the link positioned between the gripping jaws by the curbing jaws;

Figs. 18 and 19 are similar views showing the link after curbing;

Figs. 20 and 21 are similar views showing the completed link positioned to receive the next link to be formed; and Fig. 22 is a plan view of a completed curbed chain formed by the present mechanism.

The machine of the present invention is designed to automatically provide a curb chain where the wire forming each link is passed through two or more of the links prior to the completion of the link being formed and prior to the severing of the wire from the elongated piece from which it is fed. The hereinafter described machine and method provide a double curbed chain which is manufactured automatically without the necessity of hand manipulation of the wire stock or any of the machine parts.

Figure 1:
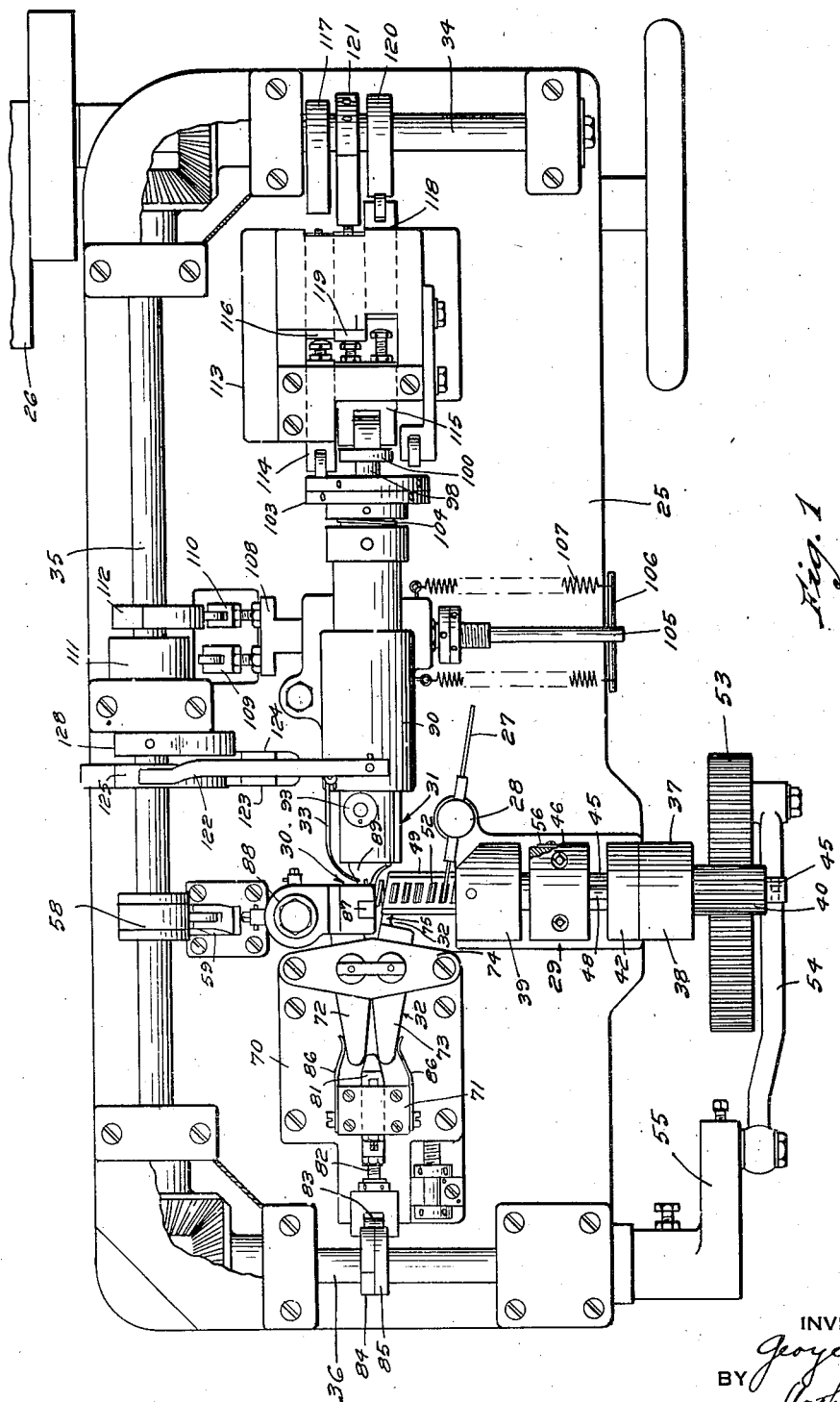
Fig. 1 is a top plan view of the machine of the present invention.
Figure 2:
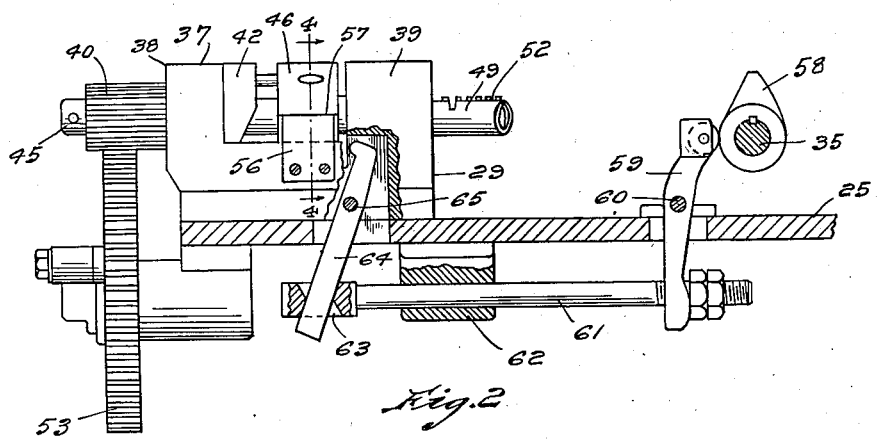
Fig. 2 is a side elevation of the link forming mechanism.
Figure 3:
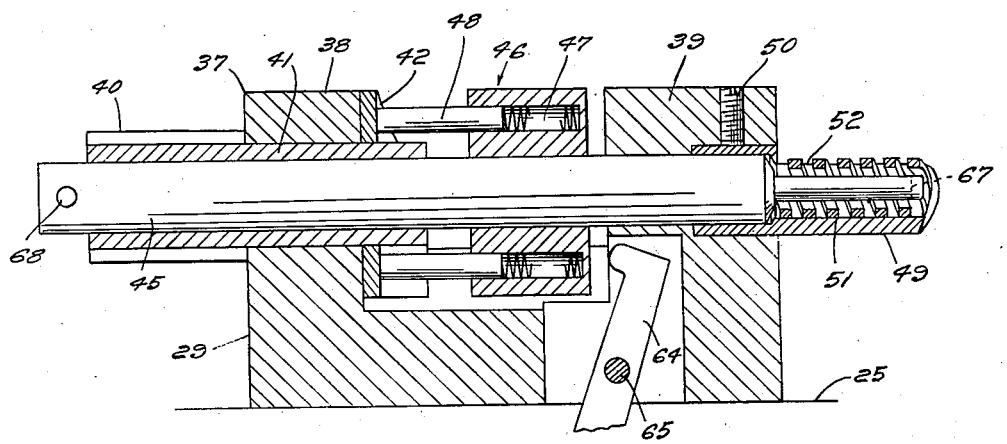
Fig. 3 is an enlarged vertical section of the link forming mechanism.

The general construction of applicant's machine can best be followed in the plan view shown in Fig. 1 of the drawings. The machine is preferably laid out on a flat surface or table top such as 25, power being applied to a single driving pulley 26. The machine comprises various units, each performing a particular function, and synchronized to perform the various steps of the operating method in their proper sequence. A coil of wire (not shown) is mounted on a stand adjacent the machine, and the wire stock 27, feeds through a guide 28 into the coil forming portion of the apparatus 29, which forms the wire into a helix and moves it towards the cutter 30. When a sufficient amount of coiled wire has been advanced for making a complete link, the curbing head 31 moves forwardly and grips the wire. The cutting jaw 32 then swings past the end of the cutter 30 to shear the link from the helix. The curbing head 31 then drops downwardly in alignment with a pair of gripping jaws positioned below the cutting jaws. The gripping jaws now grasp the link and hold it securely as the curbing head 31 is rotated through an angle of approximately 90° to curb the link. After this operation, the gripping jaws release the link and the jaws on the curbing head 31 turn back 90° and the curbing head is raised to its original position. This positions the link in the path of rotation of the helix so that further movement of the helix will pass the end of the helix through the previously formed link. As the linking operation takes place, the curbing head releases the previously formed link and permits it to hang loosely on the end of the helix. The curbing head then moves forwardly and grips the end portion of the helix which is to form the new link and the operation is repeated.

After two links have thus been formed, the first formed link is positioned by a finger 33 on the curbing head housing 90 which holds the first formed link in proper alignment with the second formed link so that the end of the helix will pass through both links simultaneously producing a double curb chain.

While any suitable means for operating the various units of the machine may be used, I prefer to apply the power to a shaft 34 and transmitted through proper gearing to shafts 35 and 36 extending around the edge of the machine. The shafts 34, 35 and 36 can then be provided with cam arrangements for operating the various portions of the machine hereinabove described in their proper sequence.

The coil forming unit

The coil forming mechanism 29 is illustrated in detail in Figs. 2 to 6 inclusive of the drawings. Referring to these figures, I provide a block 37 having a bearing 38 at one end and a bearing 39 at the other end in horizontal alignment therewith. A gear 40 is mounted contiguous the bearing 38 and having an integral sleeve portion 41 extending into the bearing. Locked to the inner end of the sleeve 41 is a clutch element 42, having oppositely disposed clutching shoulders 43, and inclined surfaces 44. An arbor 45 is rotatably mounted within the sleeve 41 and the bearing 39. Fixed to the central portion of the arbor 45 is a complementary clutch member 46 having diametrically opposed recesses 47 which open towards the clutch element 42. Each recess 47 has mounted therein a spring-pressed pin 48 adapted to ride on the surface of the clutch element 42 and engage the shoulders 43, so that turning movement of the gear 40 in one direction causes interlocking engagement between the clutch element 42, pins 48 and complementary clutch member 46 and causes turning movement of the arbor 45, while turning movement of the gear 40 in the opposite direction will produce no movement of the arbor 45 inasmuch as the pins 48 will ride over the shoulders 43 of the clutch element 42. Mounted in the forward end of the bearing 39 is an internally threaded housing 49 which may be securely held therein as by the set screw 50. The end of the arbor 45 extends into the housing 49 and is provided with an integral narrow reduced portion 51 which extends through the internally threaded portion of the housing 49. The portion 51 is of the same cross-section as the outer shape of the link, and in the illustrated form is of oval cross-section to form the links illustrated in Fig. 22.

The wire stock 27 feeds through the holder 28 and is threaded into the helical channel 52 formed by the internal thread of the housing 49. As the wire 27 is wound about the reduced portions 51 of the arbor 45 it is frictionally locked thereto so that rotation of the arbor 45 causes the engagement between the wire and the channel to pull the arbor forwardly. The unit 29 is driven by means of a gear 53 which is connected through a link 54 to a crank 55 keyed to the end of the shaft 36. The gear 53 is driven in one direction a sufficient distance to cause the gear 40 to make slightly more than a complete revolution and is then rocked in the opposite direction a sufficient distance to cause the gear 40 to make slightly more than a complete revolution in its opposite direction. This movement is transmitted through the clutch members 42 and 46 so that the arbor 45 is alternately moved a complete revolution in one direction and then remains stationary as the gear 40 makes a complete revolution in the opposite direction inasmuch as the pins 48 will then ride over the inclined surfaces 44 and over the shoulders 43 of the clutch element 42. When the arbor 45 makes a complete revolution, it forces one complete turn of the helically wound wire out of the housing 49, this being sufficient to form a complete link. At this point rotation of the arbor stops, and backward movement of the arbor 45 is prevented by the inter-engagement of an outer spring 56 with a notch 57 in the outer circumference of the clutch member 46. Inasmuch as the tension on the helically wound wire has now terminated, its frictional engagement with the reduced portion 51 of the arbor is lost and this may be facilitated by a slight backward play of the arbor. This frees the arbor from the coil of wire. At this point, a cam 58 on the shaft 35 engages a lever 59 and causes it to move about a central pivot 60. The opposite end of the lever 59 loosely engages the end of a shaft 61 and pulls it through the bearing 62. The opposite end of the shaft 61 is provided with an opening 63 through which the lower end of a lever 64 passes. The lever 64 is pivoted, as at 65, in the base of the block 37. The opposite end of the lever 64 will therefore push against the clutch member 46 and force it backwardly against the action of the springs 47 so that the clutch member 46 and the arbor 45 will slide backwardly a distance sufficient to push another link out of the housing 49. Turning movement of the gear 40 again causes the arbor 45 to engage the helical wire within the housing 49 and push another section of the helical wire out of the housing to form a successive link.

The cutting and gripping jaws

The cutting and gripping unit 32 is mounted to the left of the coil forming unit 29, as shown in Fig. 1, and is more fully shown in detail in Figs. 10 and 11 of the drawings. The cutting and gripping unit 32 is mounted on a base 70 having an integral upstanding block 71. Pivoted to the forward end of the base 70 are a pair of jaws 72 and 73, the upper ends of the pivot being mounted in a bridge portion 74. Each of the jaws 72 and 73 is provided on its inner face with a lower and an upper recess for receiving gripping, cutting and shaping inserts which may be replaceable for different sizes and shapes of links. The jaws 73 is provided in its upper recess with a cutting insert 75 and in its lower recess with a gripping insert 76. The jaw 72 is provided in its upper recess with a shaping insert 77 and in its lower recess with a complementary gripping insert 78 cooperating with the gripping insert 76. The various inserts are retained in place as by set screws 79. The backs of the jaws 72 and 73 are tapered, as at 80, to form a V-shaped recess between the jaws. Slidably mounted in the block 71 is a wedge 81 adapted to enter the V-shaped recess between the back of the jaws 72 and 73 and force them into closed or gripping position. The back of the wedge 81 is provided with an adjustable portion 82 carrying a roller 83 adapted to bear against operating cams 84 and 85 on the shaft 36. The block 71 is also provided with flat springs 86 adapted to bear against the outer rear sides of the jaws 72 and 73 and resiliently push the jaws into open position when the wedge is withdrawn.

Mounted above and cooperating with the cutting insert 75 is a cutting tool 87 which is adjustably mounted on a tool post 88 on the base 25. The helical wire extending from the coiling unit 29 turns into position between the cutting insert 75 and the cutting tool 87. At this point the wire is gripped by the jaws 89 of the curbing head 31. The cam 84 now bears against the wedge 81 forcing it between the rear portion of the jaws 72 and 73 and causing the cutting insert 75 to move beneath the cutting tool 87 and sever the projecting link from the helix. Simultaneously therewith, the shaping insert 77 swings towards the cutting insert 75 and tends to push the free ends of the link into alignment. The cam 84 releases and the wedge 81 is withdrawn, the jaws 72 and 73 being swung to open position by the springs 86. Simultaneously therewith the curbing head 31, the jaws 89 retaining the link therebetween, moves downwardly and then advances forwardly inserting the link between the gripping insert 76 and 78. The cam 85 on the shaft 36 now operates the wedge 81 so that the gripping jaws close and the link is now gripped between the gripping insert 76 and 78 and the gripping jaws 89 on the curbing head. The curbing head turns through an angle of approximately 90° curbing the link, after which the wedge 81 withdraws releasing the link from the gripping insert 76 and 78, the link being retained in the jaws 89 for subsequent operation.

The curbing head

The curbing head 31 is mounted to the right of the machine as viewed in Fig. 1 in alignment with the gripping and cutting unit 32. The curbing head 31 comprises a curbing head housing 90 having a central horizontal bore 91 and a depending integral shank 92 slidably mounted for vertical movement in the base 25. A jaw holder 93 is mounted in the bore 91 and is provided at its forward end with a recess 94 in which the curbing jaws 89 are pivotally mounted. The jaws 89 are provided with overlapping complementary tabs through which the pivot pin 95 extends and are tapered towards the rear portion thereof to provide a V-shaped recess 96 into which a wedge can be inserted to operate the jaws 89. The rear portions of the jaws 89 are further provided with a tension spring 97 adapted to resiliently pull the rear portions towards each other and thus retain the jaws 89 in open position.

The jaw holder 93 is provided with a central bore 98 in which a wedge 99 is horizontally slidable. The front end of the wedge 99 is conically tapered and adapted to enter the V-shaped cutout 96 between the jaws 89 to lock the jaws against the action of the spring 97. The opposite end of the wedge 99 is provided with a head 100 to which the operating force is applied in working the jaws. The central outer section of the jaw holder 93 is provided with external teeth or gears 101 adapted to mesh with a rack 102 which is slidably mounted for horizontal movement beneath the jaw holder 93 and at right angles to the axis of the jaw holder. The jaw holder 93 is further provided with a head 103 which bears against a coil spring 104 positioned between the head and the housing 90 and adapted to resiliently push the jaw holder and the jaws pivoted thereto to the right as viewed in Fig. 8.

Figure 9:
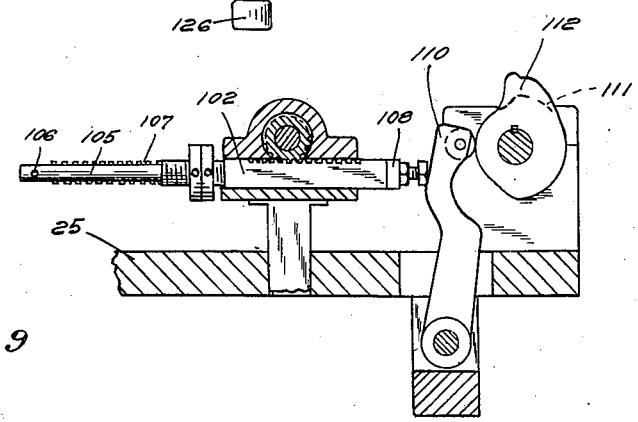
Fig. 9 is a detailed sectional view of the rotating mechanism of the curbing head.

As can more readily be seen in Figs. 1 and 9 the rack 102 is provided at one end with an aligned shaft 105 carrying a bar 106 at its outer end to which springs 107 are hooked, the opposition ends of the springs being attached to the casting 90 so that tension of the springs serves to resiliently retain the rack in the position shown in Fig. 9. The opposite end of the rack 102 is provided with a head 108 bearing against levers 109 and 110. The lever 109 is adapted to bear against a cam 111 and the lever 110 is adapted to bear against a cam 112, the cams 111 and 112 being keyed to the operating shaft 35 as shown in Fig. 1.

The horizontal movements of the jaw holder 93 are controlled from the mechanism at the extreme right of the machine as shown in Fig. 1. This comprises a block 113 provided with two plungers 114 and 115, the plunger 114 abutting the head 103 and the plunger 115 abutting the head 100 on the wedge 99. The plunger 114 is operated by a second plunger 116 in alignment therewith, which bears against a cam 117, and the plunger 115 is operable by two plungers 118 and 119 respectively operated by cams 120 and 121. The cams 117, 120 and 121 are mounted on the shaft 34.

Figure 7:
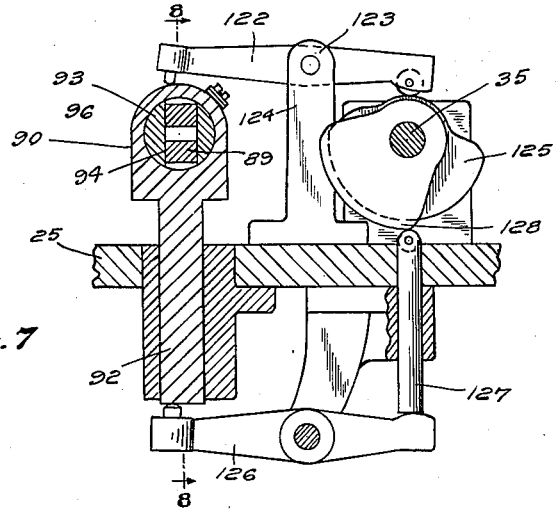
Fig. 7 is a detailed view, partially in section, of the raising and lowering mechanism for the curbing head.

Vertical movement of the curbing head housing 90 is controlled by the mechanism shown in detail in Fig. 7. Mounted intermediate the curbing head and the rear shaft 35 is a rocker arm 122 pivoted as at 123 to a standard 124. One end of the arm 122 bears against the top of the curbing head as shown in Fig. 7, and the other end rides on a cam 125 which is mounted on the shaft 35. Movement of the cam 125 will therefore raise the arm 122 and push the curbing head downwardly. A second rocker arm 126 is pivotally mounted beneath the table 25 and has one end bearing against the shank 92 of the curbing head housing 90 and its opposite end bearing against a plunger 127 which rides against the underside of a cam 128 mounted on the shaft 35. Movement of the cam 128 is adapted to move the rocker arm 126 downwardly and thus push the shank 92 upwardly, the cams 125 and 128 and rocker arms 122 and 126 cooperating to impart vertical reciprocation to the curbing head.

Figure 8:
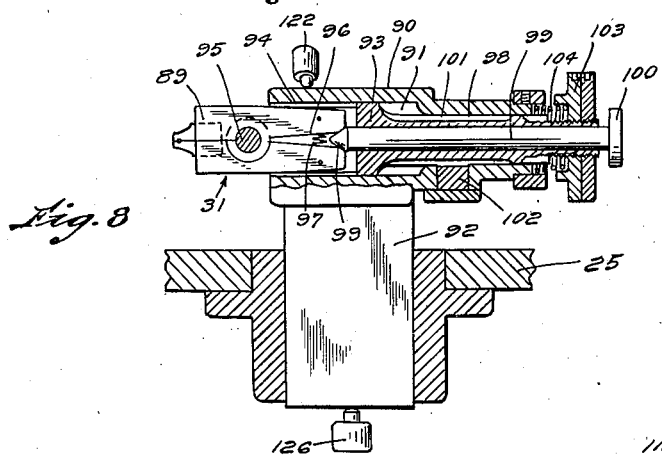
Fig. 8 is a section taken on line 8—8 of Fig. 7.

The functions and operations of the curbing head 31 in relation to the previously described portions of the apparatus may now be summarized. When the coiling unit 29 has advanced a sufficient portion of the helical wire to make one link, the cam 111 bears against the lever 109 and pushes the rack 102 transversely of the jaw holder 93 a sufficient distance to impart a small turn to the jaw holder so that the angle of the jaw opening will be in alignment with the angle at which the helical wire is disposed. While this is taking place, the cam 117 on the shaft 34 moves the plunger 116 and plunger 114 against the head 103 causing the jaw holder 93 carrying the jaws 89 to move forwardly, the jaws 89 being positioned on each side of the protruding helical wire. At this point, the cam 121 on the shaft 34 moves the plunger 119 and 115 against the head 100 on the wedge 99 which move forwardly into the recess 96 and causes the jaws 89 to close against the action of the spring 97. The gripping and cutting unit 32 now severs the link from the helix and the cam 111 releases the curbing head so that it now is returned to vertical position by movement of the rack 102 caused by the springs 107. The cam 125 on the shaft 35 now causes the rocker arm 122 to move the curbing head housing 90 downwardly so that the severed link is brought between the open jaws of the gripping inserts 76 and 78 which now close upon it to grip the opposite side of the link. The cam 112 on the shaft 35 now bears against the lever 110 and causes the rack 102 to turn the jaw holder 93 through an angle of approximately 90°. Since the gripping and cutting unit remains fixed, the link is curbed by the twisting action of the curbing head. The gripping inserts 76 and 78 now release the link and the curbing head jaws 89 are turned back through an angle of 90° by the release of the cam 112. Simultaneously therewith, the cam 128 bears downwardly on the shaft 127 and the rocker arm 126 pushes the shank 92 upwardly and causes the curbing head housing carrying the jaw holder to move upwardly to its original horizontal level. Simultaneously with the aforementioned operation, the cam 121 releases its pressure on the head 100, the cam 117 having already released pressure on the plunger 114. This causes the spring 104 to move the jaw holder 93 to the right as shown in Figs. 1 and 8, the cam 120 now moving the plunger 118 against the plunger 115 so that the wedge 99 will be retained between the jaws to keep them in closed position during this movement. The link is now positioned in the path of movement of the helix so that further movement of the coiling unit 29 will cause the end of the wire coil to pass through the completed link retained between the jaws 89. As the end of the wire coil is linked through the completed link, the cam 120 releases the plungers 118 and 115 from the head 100 and the jaws 89 immediately release the newly formed link which is allowed to drop onto the end of the helix. The machine is now ready for another cycle of operation.

The guide finger

The curbing head housing 90 carries the guide finger 33 which extends forwardly and has its end curving downwardly in the path of movement of the jaws 89 as shown in Fig. 1. After the above-described operation of the machine has formed two links, the second link being retained in the jaws 89 of the curbing head preparatory to linking with a third link to be formed, the backward movement of the curbing head, which is to the right as shown in Fig. 1, will cause the end of the finger 33 to retard and block the movement of the first link and push it into position along the second link so that as the end of the helix moves forwardly it will pass through both the first and second links before the jaws 89 let go of the second link. This repeated action causes the formation of a double curb chain instead of the single curb chain which would otherwise have been formed.

The operation

Figure 4:
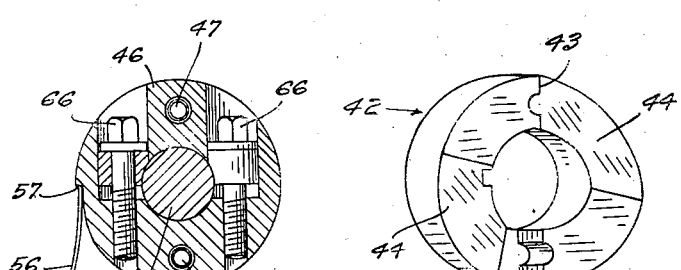
Fig. 4 is a section taken on line 4—4 on Fig. 2.
Figure 5:
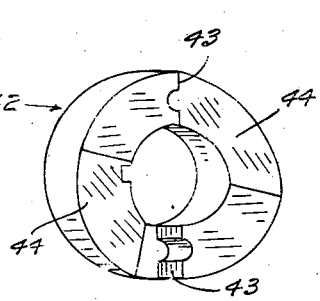
Fig. 5 is a perspective view of the clutch element.
Figure 6:
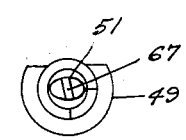
Fig. 6 is an end view of the coil forming arbor.

To set up the machine for operation, the clutch member 46 is loosened from the arbor 45 by releasing the clamp screws 66 shown in Fig. 4 and the arbor is withdrawn until the end of the reduced portion 21 comes under the beginning of the internal threaded channel 52. The wire stock 27 is passed through the guide 28, and the end of it is bent and inserted into a slot 67 at the end of the arbor. The arbor is then manually rotated by inserting a bar through the opening 68 at its opposite end. As the arbor is manually rotated the wire stock will wind around the reduced portion 51 and pull the arbor inwardly until the end of the helical wire will begin to project from the housing 49. The clamp screws 56 are now tightened and the machine is ready for automatic operation. The end of a completed portion of chain may be hung on the exposed end of the helical coil, the bent portion, which was inserted in the slot 67, being first sheared off.

The link and chain are now in a position shown in Figs. 12 and 13. The next operation of the machine is the slight turning of the curbing head caused by the movement of the cam 111 on the shaft 35. The curbing head is then moved forwardly by the action of the cam 117 and the jaws 89 grasp the end of the helical wire as shown in Figs. 14 and 15, and the cutting insert 75, shaping insert 77, and cutting tool 87 are brought into operation by the cam 84 to complete the cutting of the link as shown in Figs. 14 and 15.

The cam 84 now releases the cutting insert 75 and the jaws 72 and 73 are open. The curbing head is now pushed downwardly by the unit illustrated in Fig. 7, the cam 125 bearing against the rocker arm 122 and pushing the curbing head casing 90 downwardly. This causes the jaws 89 to position the link between the gripping jaws 76 and 78 as shown in Figs. 16 and 17. Action of the cam 85 causes the gripping jaw inserts 76 and 78 to grasp the opposite side of the link. The curbing head is now turned through an angle of 90° by the action of the cam 112 and the rack 102. This brings the jaws in the position shown in Figs. 18 and 19.

The gripping inserts 76 and 78 are now released and the curbing head is turned by the rack 102 back through an angle of 90° to its original position and is pushed upwardly by the action of the cam 128 on the plunger 127 and on 126 as shown in Fig. 7. Simultaneously therewith, the cams 117 and 121 on the shaft 34 release and cause the jaw holder 93 and jaws 89 to move back. It should be noted that when the jaws are in the position shown in Figs. 18 and 19 the guide finger 33 rests on the jaws 89 adjacent the outer circumference of the link just formed. As the movement hereinabove described takes place and the jaws assume the position shown in Figs. 20 and 21, the backward movement of the curbing head causes the newly formed link to pass beneath the end of the guide finger 33 which holds back the progress of the link previously formed and suspended on the newly formed link and positions it, as shown in Figs. 20 and 21, so that the end of the helix rotating from the end of the coiling unit 29 passes through both the newly formed link and the link previously formed prior to the release of the link from the jaws 89.

I claim:

1. In a machine for the continuous manufacture of multiple linked chains, means for successively shaping wire lengths into links, and means for interlocking the links comprising mechanism for successively holding each shaped link in position to receive a length of wire therethrough, means for moving the next succeeding link in alignment with the previous held link to also receive the same length of wire therethrough, means for feeding wire through both links, and means for cutting the fed wire into lengths for shaping to form the next link after passage through the two links.

2. In a machine for the continuous manufacture of double curbed chain, means for successively shaping wire lengths into curbed links, and means for interlocking the links comprising mechanism for successively moving each curbed link in position to receive a length of wire therethrough, means for stopping movement of the previously formed link during the movement of the positioning means, means for feeding wire through both links, and means for cutting the fed wire into lengths for shaping to form the next curbed link after passage through the two links.

3. In a machine for the continuous manufacture of multiple linked chains, means for successively feeding wire forwardly in the path of a helix, means for successively shaping cut lengths of said wire into links, and means for interlocking the links comprising mechanism for successively holding each shaped link in position to receive the wire therethrough, means for moving the next succeeding link in alignment with the previous held link to also receive the wire therethrough, means for feeding the wire helically forwardly to cause the wire end to pass upwardly through both links, and means for cutting the fed wire into lengths for shaping to form the next link after passage through the two links.

4. In a machine for the continuous manufacture of multiple linked chains, means for successively feeding wire forwardly in the path of a helix, means for successively shaping cut lengths of said wire into links, and means for interlocking the links comprising a stop finger for successively holding each shaped link in position to receive the wire therethrough, means for moving the next succeeding link in alignment with the previous held link to also receive the wire therethrough, means for feeding the wire helically forwardly to cause the wire end to pass upwardly through both links, and means for cutting the fed wire into lengths for shaping to form the next link after passage through the two links.

5. In a machine for the continuous manufacture of multiple curbed chains, means for successively feeding wire forwardly in the path of a helix, means for successively cutting segments of the wire and forming links wherefrom, means for gripping and moving the last made link into position to receive the fed wire, and means to prevent movement of the previously formed links during the movement of said gripping and moving means, whereby said last made link is moved into alignment with the previously formed links to receive the fed wire through a plurality of links.

6. In a machine for the continuous manufacture of multiple curbed chains, means for successively feeding wire forwardly in the path of a helix, means for successively cutting segments of the wire and forming links wherefrom, means for gripping and curbing the link, means for gripping and moving the last made link into position to receive the fed wire, and means to prevent movement of the previously formed links during the movement of said gripping and moving means, whereby said last made link is moved into alignment with the previously formed links to receive the fed wire through a plurality of links.

7. In a machine for the continuous manufacture of multiple curbed chains, means for successively feeding wire forwardly in the path of a helix, means for successively cutting segments of the wire and forming links wherefrom, means for gripping and moving the last made link into position to receive the fed wire, and a stop element to prevent movement of the previously formed links during the movement of said gripping and moving means, whereby said last made link is moved into alignment with the previously formed links to receive the fed wire through a plurality of links.

8. In a machine for the continuous manufacture of multiple curbed chains, means for successively feeding wire forwardly in the path of a helix, means for successively cutting segments of the wire and forming links wherefrom, means for gripping and moving the last made link into position to receive the fed wire, and means to prevent movement of the previously formed links during the movement of said gripping and moving means, whereby said last made link is moved into alignment with the previously formed links to receive the fed wire through a plurality of links.

9. In a machine for the continuous manufacture of multiple curbed chains, means for successively feeding wire forwardly in the path of a helix, means for successively cutting segments of the wire and forming links wherefrom, means for gripping and curbing the links, means for gripping and moving the last made link into position to receive the fed wire, and a stop element to prevent movement of the previously formed links during the movement of said gripping and moving means, whereby said last made link is moved into alignment with the previously formed links to receive the fed wire through a plurality of links, the free end of said fed wire passing upwardly through the links.

10. In a machine for the continuous manufacture of multiple curbed chains, means for successively feeding wire forwardly in the path of a helix, means for successively cutting segments of the wire and forming links therefrom, a gripping head, a gripping jaw slidable in said head for gripping and curbing the links, means for sliding said gripping jaw to move the last made link into position to receive the fed wire, and means on said head and extending into the path of movement of said jaw and link to prevent movement of the previously formed links during the movement of said gripping jaw, whereby the last made link is moved into alignment with the previously formed links to permit the fed wire to pass through a plurality of links.

11. In a machine for the continuous manufacture of multiple curbed chains, means for successively feeding wire forwardly in the path of a helix, means for successively cutting segments of the wire and forming links therefrom, a gripping head, a gripping jaw slidable in said head for gripping and curbing the links, means for sliding said gripping jaw to move the last made link into position to receive the fed wire, and a stop finger on said head and extending into the path of movement of said jaw and link to prevent movement of the previously formed links during the movement of said gripping jaw, whereby the last made link is moved into alignment with the previously formed links to permit the fed wire to pass through a plurality of links.

GEORGE E. KEENE.